United States Patent Office 2,850,501
Patented Sept. 2, 1958

2,850,501

BASIC ESTERS OF 9-PYRID (3,4-b) INDOLE ALKANOIC ACID

Walter Voegtli, Evanston, Ill., assignor to G. D. Searle & Co., Chicago, Ill., a corporation of Delaware No Drawing. Application July 30, 1956
Serial No. 600,671

6 Claims. (Cl. 260—294.9)

This invention relates to 9-pyrid(3,4-b)indole(lower) alkanoic acids, functional derivatives and non-toxic salts thereof, which in the form of their free bases can be represented by the structural formula

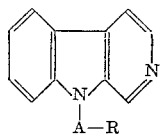

wherein A is a lower alkylene radical separating the groups attached thereto by at least 2 carbon atoms and R is cyano, $CON_3$, $CONHNH_2$, carboxyl, alkoxycarbonyl or a dialkylaminoalkoxycarbonyl group.

In the foregoing structural formula the radical A can represent a polymethylene radical such as ethylene, trimethylene, tetramethylene, pentamethylene or hexamethylene. It can also represent one of the radicals isomeric therewith, such as propylene, butylene, amylene, hexylene or a branched chain isomer thereof. The common feature of these radicals is that they interpose at least two carbon atoms between the groups to which they are attached. In the term R the alkyl portion of the carbalkoxy can represent such hydrocarbon radicals as methyl, ethyl, propyl, butyl, amyl, hexyl, and the like including branched chain isomers thereof, as well as di-(lower)alkyl amino substitution products thereof such as dimethylamino, diethylamino, diisopropylamino, dibutylamino, piperidino, pyrrolidino and the like.

A method of manufacturing compounds of the present invention can be illustrated as follows. An alkali metal derivative of norharman is reacted with a suitable ester of a haloalkanol, and the condensation product is reacted with an alkali metal cyanide such as potassium cyanide. As a specific example, the lithium derivative of norharman, prepared by reaction of norharman with phenyllithium, is reacted with 3-chloro-propyl p-toluene sulfonate, and the resulting 9-pyrid(3,4-b)indolepropyl chloride of the structural formula

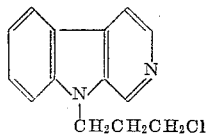

is reacted with potassium cyanide to yield 9-pyrid(3,4-b)-indolebutyronitrile from which alkyl carboxylic acid esters can be prepared directly by acid hydroylsis of the nitrile in a solvent comprising the proper alcohol to yield the desired alkyl radical. By treatment of the carboxylic acid ester thus produced with hydrazine, the corresponding carboxylic acid hydrazide is produced which on treatment with nitrous acid yields the coresponding azide.

Alternatively the nitrile may be hydroylzed directly to the acid which can be converted to the corresponding acid chloride with a reagent such as thionyl chloride from which by reaction with alcohols or with dialkyl amino alcohols the corresponding carboxylic acid esters can be prepared. The acid chloride can be used also to prepare the hydrazide and azide derivatives by reaction with hydrazine or sodium azide respectively.

Alternatively, compounds containing a 3 carbon side chain are produced conveniently by reaction of norharman with acrylonitrile to yield 9-pyrid(3,4-b)indolepropionitrile which may be treated as aforesaid to yield the corresponding derivatives.

By suitable selection of the haloalkanol esters, the alcohols, the dialkylamino alcohols and the hydrazine in the foregoing procedures, various isomers and homologs of the compounds particularly described herein can be obtained conveniently.

While for uniformity all of the compounds of this invention are described and named herein using the systematic terminology 9-pyrid(3,4-b)indole, this parent ring system has been described in the literature also as norharman or β-carboline and it will be understood that these are exactly equivalent names for the parent tricyclic ring system.

Equivalent to the free bases of this invention for the purposes described herein are their non-toxic addition salts. Such salts are formed by reaction of the appropriate free base with one of a variety of inorganic and strong organic acids, such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. The free bases also form quaternary ammonium salts with a variety of organic esters of sulfuric, hydrohalic and aromatic sulfonic acids.

The compounds of this invention have useful pharmacological properties. They are potent anti-hypertensive agents, and their administration causes a substantial fall in blood pressure of relatively long duration. These compounds are also depressants of the central nervous system and they produce a state of tranquility and ataraxia which is desirable in the treatment of conditions characterized by mental agitation. They are, additionally, effective anti-emetic agents.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are expressed in degrees centigrade (° C.) and pressures in millimeters (mm.) of mercury and quantities of materials in parts by weight and parts by volume which bear the same relation one to another as kilograms to liters.

*Example 1*

To a well stirred suspension of 12 parts by weight of norharman and 20 parts by volume of acrylonitrile are added three drops of 40 percent benzyltrimethyl ammonium hydroxide (Triton B) and the mixture allowed to stand for one hour. The reaction product which precipitates is crushed, washed successively with petroleum ether and two portions of 60 percent ethanol, dried, and sublimed at 0.02 mm. pressure and a temperature of 180° to yield 9-pyrid(3,4-b)indolepropionitrile; M. P. 152–154°.

One part by volume of methyl iodide is added to a solution of 1 part by weight of 9-pyrid(3,4-b)indolepropionitrile dissolved in 10 parts by volume of acetone and allowed to stand at room temperature for 2 hours. The reaction mixture is filtered and the residue washed with acetone. The product is dissolved in 30 parts by volume of hot nitromethane which contains a few drops of water, the mixture filtered and an equal volume of ethyl acetate added to the filtrate. After standing the mixture is filtered, washed with a 1:1 mixture of nitromethane-ethyl acetate and finally with ethyl acetate to yield the methiodide of 9-pyrid(3,4-b)indolepropionitrile which after a second recrystallization melts at 274–276° (dec.).

*Example 2*

5 parts by weight of 9-pyrid(3,4-b)indolepropionitrile is dissolved in 130 parts by volume of 95 percent alcohol and the mixture refluxed for 7 hours while passing into the solution a slow stream of dry hydrogen chloride. After standing overnight most of the alcohol solvent is removed by distillation. Ice is added to the residue and the mixture made alkaline with potassium carbonate. The alkaline solution is extracted successively with 50 parts by volume of chloroform and two portions of 50 parts by volume of ether. The extracts are combined, dried over potassium carbonate, filtered and the solvents removed by distillation. The residue is dissolved in 50 parts by volume of acetone to which is added an excess of isopropanolic hydrogen chloride. A precipitate quickly forms and, after standing, is filtered off, washed with acetone, then with ether and recrystallized from ethanol-ethyl acetate (1:2) to yield the hydrochloride of ethyl 9-pyrid(3,4-b)indolepropionate, M. P. 220–222° (dec.).

Two parts by weight of ethyl 9-pyrid(3,4-b)indolepropionate hydrochloride is dissolved in water and the resulting solution made alkaline with potassium carbonate while cooling the mixture. The alkaline mixture is extracted with 25 parts by volume of chloroform and with two successive 25 parts by volume portions of ether. The extracts are combined and washed with three successive portions of ice water (10 parts by volume portions) and dried over sodium sulfate. The solvents are then removed by distillation and the resulting base dissolved in 7 parts by volume of isopropanol to which 2 parts by volume of methyl iodide are added. After standing for two days the solution is diluted with about 15 parts by volume of petroleum ether. The precipitate which forms is filtered off and washed with petroleum ether. The residue is recrystallized from 1:1 isopropanol-petroleum ether to give the methiodide of ethyl 9-pyrid(3,3-b)indolepropionate; M. P. 139–141° (dec.).

*Example 3*

4.8 parts by weight of ethyl 9-pyrid(3,4-b)indolepropionate and 3 parts by volume of hydrazine hydrate are dissolved in 15 parts by volume of ethanol and refluxed for 8 hours. After standing for 10 hours the mixture is diluted with 20 parts by volume of ether. After standing for two hours additional in a refrigerator the crystalline material which separates is filtered off and washed with two successive portions of 15 parts by volume of isopropanol-ether (1:1) and then with ether. The 9-pyrid(3,4-b)indolepropionic acid hydrazide thus obtained melts at 167–168°.

*Example 4*

4 parts by weight of 9-pyrid(3,4-b)indolepropionitrile, 10 parts by volume of water, 10 parts by volume of acetic acid and 10 parts by volume of 95 percent sulfuric acid are refluxed for 2¼ hours and then diluted with 400 parts by volume of hot acetone. The solution is allowed to stand overnight in the refrigerator and the crystalline material which forms filtered off and recrystallized from acetic acid-acetone to yield the sulfate salt of 9-pyrid(3,4-b)indolepropionic acid; M. P. 224–227° (dec.).

*Example 5*

6 parts by weight of the sulfate salt of 9-pyrid(3,4-b)indolepropionic acid is dissolved in a solution of 10 parts by weight of potassium carbonate and 40 parts by volume of water. 10 parts by weight of sodium acetate are added followed by sufficient glacial acetic acid to bring the pH to 6. After standing, the crystalline material which separates is filtered off and the residue washed successively with 30 percent sodium acetate solution, ice water and then with acetone to yield 9-pyrid(3,4-b)indolepropionic acid; M. P. 241–243° (slight dec.).

One part by weight of 9-pyrid(3,4-b)indolepropionic acid, 2 parts by weight of diisopropylaminoethyl chloride and 20 parts by volume of isopropanol are heated on a steam bath for 1½ hours. One part by weight of diisopropylaminoethyl chloride in 10 parts by volume of isopropanol is added and the mixture heated for an additional 1½ hours. The reaction mixture is dissolved in 100 parts by volume of water and extracted with two successive 30 part by volume portions of ether. The aqueous solution is made strongly alkaline with potassium carbonate while cooling. The supernatant liquor is decanted from the semisolid material which precipitates and is extracted with two successive portions of chloroform. The solid precipitate is dissolved in the combined chloroform extracts, the resulting solution dried over potassium carbonate, filtered and the chloroform removed by distillation. The resulting residue is recrystallized by dissolving it in about 20 parts by volume of chloroform to which about 100 parts by volume of ether is added after solution. The crystalline material thus obtained melts at 208–209° (dec.) and has the formula

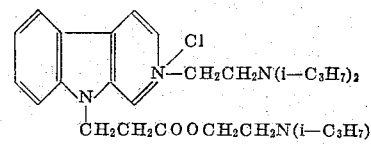

By substituting dimethylaminopropyl chloride for the diisopropylaminoethyl chloride used above, the corresponding dimethylaminopropyl analog is obtained having the formula

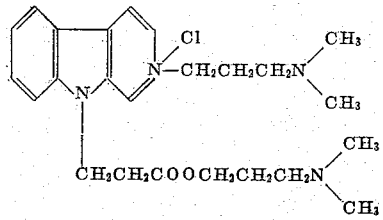

By substituting 2,6-dimethylpiperidinoethyl chloride for the diisopropylaminoethyl chloride used above, the corresponding 2,6-dimethylpiperidinoethyl analog is obtained having the formula

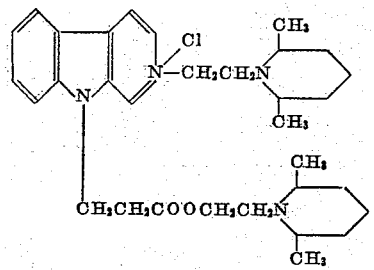

By substituting 2,5-dimethylpyrrolidinoethyl chloride for the diisopropylaminoethyl chloride used above, the corresponding 2,5-dimethylpyrrolidinoethyl analog is obtained having the formula

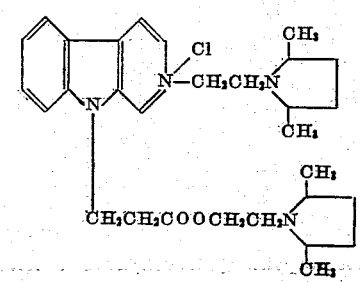

Example 6

2.5 parts by weight of 9-pyrid(3,4-b)indolepropionic acid and 100 parts by volume of thionyl chloride are refluxed for 24 hours. The excess thionyl chloride is then removed by distillation and to the residue is added 2 parts by weight of diisopropylaminoethanol and the resulting mixture heated at 100° for 4 hours. The reaction mixture is dissolved in 10 parts by volume of water, made alkaline with potassium carbonate and the alkaline solution extracted with two 250 parts by volume portions of benzene. The benzene extracts are combined, dried over potassium carbonate, filtered, the benzene removed by distillation and the residue heated at 90° under 0.01 mm. pressure for one hour. The residue is dissolved in 10 parts by volume of isopropanol to which is added a slight excess of isopropanolic hydrochloric acid. The hydrochloride of diisopropylaminoethyl 9-pyrid(3,4-b)-indolepropionate which forms is precipitated with ether, filtered off and washed with ether.

Example 7

2.54 parts by weight of 9-pyrid(3,4-b)indolepropionic acid hydrazide is dissolved in 100 parts by volume of cold 0.1 normal hydrochloric acid. While maintaining the solution at 0°, 10 parts by volume of 1 normal sodium nitrite is added, and then over a period of three minutes 130 parts by volume of 0.1 normal hydrochloric acid is added with vigorous stirring. The mixture is stirred for 5 minutes longer, then 400 parts by volume of cold ether is added, followed by 40 parts by volume of 1 normal sodium bicarbonate. The aqueous layer is separated and extracted with 200 parts by volume of ether. The extract is combined with the ether layer and washed with 30 parts by volume of ice water and dried over potassium carbonate while maintaining cold. The ether solution is filtered from the potassium carbonate and added to two equivalents of diethylamine. The oily precipitate which forms is washed out with three successive portions of ice water and the ether solution dried over potassium carbonate, filtered and the ether removed by distillation. The viscous yellow oil remaining is dissolved in acetone and excess isopropanolic hydrochloric acid added. Ether is added to turbidity and after standing the crystalline precipitate is filtered off, washed with acetone-ether (1:1) and finally with ether to yield 9-pyrid(3,4-b)indolepropionic acid diethyl amide; melting point 205–208° (dec.).

The azide may be isolated from the ether solution by evaporating the solvent in vacuo to give the azide melting at 110° and having the formula

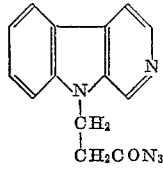

Example 8

To a stirred suspension of 6.72 parts by weight of norharman in 135 parts by volume of anhydrous benzene is added a freshly prepared solution of 3.7 parts by weight of phenyllithium in about 42 parts by volume of anhydrous ether. The reaction mixture is stirred for 2 hours, during which time a succession of color changes is observed. A solution of 10.2 parts by weight of 3-chloropropyl p-toluene sulfonate in 35 parts by volume of anhydrous benzene is added and the mixture is stirred at about 25° for an additional 18 hours. The contents of the reaction vessel are partitioned into benzene and aqueous solutions by the addition of ice water and additional quantities of benzene. The benzene phase is washed with two portions of cold water, dried and concentrated under reduced pressure. A solution of the residue and 6.5 parts by weight of potassium iodide in 100 parts by volume of ethanol is mixed with a solution of 4.0 parts by weight of potassium cyanide in 25 parts by volume of water and the mixture refluxed for 7 hours. The ethanol is removed by distillation under reduced pressure, water and potassium carbonate solution are added and the resulting mixture is extracted with chloroform. The chloroform extract is washed with water, dried, concentrated under reduced pressure and the residue subjected to purification by distillation in a short path distillation apparatus at a bath temperature of about 210–220° and a pressure of about 0.02 mm. to yield purified 9-pyrid(3,4-b)indolebutyronitrile.

5 parts by weight of 9-pyrid(3,4-b)indolebutyronitrile, 12 parts by volume of water, 12 parts by volume of acetic acid, and 12 parts by volume of 95% sulfuric acid are refluxed for 2¼ hours and then diluted with 450 parts by volume of hot acetone. After standing overnight in the refrigerator, the crystalline material which forms is filtered off and recrystallized from acetic acid-acetone to yield the sulfate salt of 9-pyrid(3,4-b)indolebutyric acid.

6 parts by weight of the sulfate salt of 9-pyrid(3,4-b)indolebutyric acid are dissolved in a solution of 10 parts by weight of potassium carbonate and 40 parts by volume of water. 10 parts by weight of sodium acetate are added followed by sufficient glacial acetic acid to bring the pH to 6. After standing, the crystalline material which separates is filtered off and the residue washed successively with 30% sodium acetate solution, ice water and then with acetone to yield 9-pyrid(3,4-b)-indolebutyric acid.

5 parts by weight of 9-pyrid(3,4-b)indolebutyric acid are refluxed for 24 hours with 100 parts by volume of thionyl chloride. The excess thionyl chloride is removed by distillation and to the residue is added 2.8 parts by weight of diethylaminopropanol and the refluxing mixture is heated for 4 hours at 100° in an oil bath. The reaction mixture is dissolved in 70 parts by volume of water and extracted with 2 portions of 25 parts by volume of ether. The aqueous phase is saturated with potassium carbonate while keeping the mixture cold. The oil fraction is extracted with 2 portions of 25 parts by volume of chloroform and the combined chloroform extracts dried over potassium carbonate, filtered and the chloroform removed by distillation. The resulting oil is heated for 1 hour at 100° under a pressure of about 0.05 mm. The hydrochloride is prepared by dissolving the oil in isopropanol and adding excess isopropanolic hydrogen chloride. An additional crop of the hydrochloride salt is obtained by diluting the mixture with ether to yield the hydrochloride of diethylominopropyl 9-pyrid(3,4-b)indolebutyrate.

Example 9

To a mixture of 105 parts by weight of p-toluene sulfonyl chloride and 108 parts by weight of 4-chloro-1-butanol maintained at about 10–15°, there is added with stirring a solution of 32 parts by weight of soduim hydroxide and 150 parts by volume of water. Stirring is continued for 1 hour after which there is added 105 parts by weight of p-toluene sulfonyl chloride followed by an additional 32 parts by weight of sodium hydroxide in 150 parts by volume of water. Stirring is continued three hours after which the reaction mixture is extracted with several portions of ether, the combined ethereal extracts washed successively with water, 20 percent aqueous sodium hydroxide solution, dried, and concentrated under reduced pressure, leaving a residue of 4-chlorobutyl p-toluene sulfonate. This product can be purified by distillation under reduced pressure.

To a suspension of 8 parts by weight of norharmn in 160 parts by volume of anhydrous benzene is added while stirring, a freshly prepared solution of 4.4 parts by weight of phenyllithium in about 120 parts by volume of anhydrous ether. The reaction mixture is stirred for 2 hours at about 25°, and then a solution of 12.9 parts by weight of 4-chlorobutyl p-toluene sulfonate in 50 parts by volume of anhydrous benzene is added. The mixture is stirred at about 25° for an additional 24 hours after which it is partitioned into benzene and aqueous solutions by the addition of ice water and additional quantities of benzene. The benzene phase is washed with several portions of cold water, dried and concentrated under reduced pressure. A solution of the residue and 7.9 parts by weight of potassium iodide in 100 parts by volume of ethanol is mixed with a solution of 4.5 parts by weight of potassium cyanide in 25 parts by volume of water and the mixture is heated under reflux for 8 hours. The ethanol is removed by distillation under reduced pressure, ice and potassium carbonate solution are added and the resulting mixture is extracted with chloroform. The chloroform solution is washed with water, dried and concentrated under reduced pressure. The residue is subjected to purification by distillation in a short path distillation apparatus at a bath temperature of about 225–235° and a pressure of about 0.02 mm. to yield 9-pyrid(3,4-b)indolevaleronitrile.

5 parts by weight of 9-pyrid(3(4-b)indolevaleronitrile, 12 parts by volume of water, 12 parts by volume of acetic acid and 12 parts by volume of 95% sulfuric acid are refluxed for 2¼ hours and then diluted with 450 parts by volume of hot acetone . The mixture is allowed to stand overnight in the refrigerator and the crystalline material which forms filtered off and recrystallized from acetic acid-acetone to yield the sulfate salt of 9-pyrid(3,4-b)indolevaleric acid.

6 parts by weight of the sulfate salt of 9-pyrid(3,4-b)indole valeric acid is dissolved in a solution of 10 parts by weight of potassium carbonate and 10 parts by volume of water. 10 parts by weight of sodium acetate are added followed by sufficient glacial acetic acid to bring the pH to 6. After standing, the crystalline material which separated is filtered off and the residue washed successively with 30% sodium acetate solution, ice water and then with acetone to yield 9-pyrid(3,4-b)-indolevaleric acid.

5 parts by weight of 9-pyrid(3,4-b)indolevaleric acid are refluxed for 24 hours with 100 parts by volume of thionyl chloride. The excess thionyl chloride is removed by distillation in vacuo and to the residue is added 1.9 parts by weight of dimethylamino-ethanol and the resulting mixture heated at 100° for 4 hours. The reaction mixture is dissolved in 10 parts by volume of water, made alkaline with potassium carbonate and the alkaline mixture extracted with 250 parts by volume portions of benzene. The benzene extracts are combined, dried over potassium carbonate, filtered, the benzene removed by distillation and the residue heated at 90° under 0.01 mm. pressure for one hour. The residue is dissolved in 10 parts by volume of isopropanol to which is added a slight excess of isopropanolic hydrochloric acid. The hydrochloride of dimethylaminoethyl 9-pyrid(3,4-b)indolevalerate which forms is precipitated with ether, filtered off and washed with ether.

What is claimed is:

1. A member of the class consisting of bases and nontoxic salts thereof said bases having the structural formula

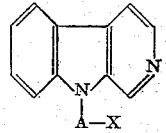

wherein A is a lower alkylene separating the groups attached thereto by at least two carbon atoms and X is a member of the group consisting of cyano, carboxyl, lower alkoxycarbonyl, hydrazinocarbonyl, di(lower)alkylamino(lower)alkoxycarbonyl, piperidino(lower)alkoxycarbonyl and pyrrolidino(lower)alkoxycarbonyl.

2. 9-pyrid(3,4-b)indolepropionitrile.
3. 9-pyrid(3,4-b)indolepropionic acid.
4. Ethyl 9-pyrid(3,4-b)indolepropionate.
5. Diisopropylaminoethyl 9 - pyrid(3,4-b)indolepropionate.
6. Diethylaminoethyl 9-pyrid(3,4-b)indolebutyrate.

No references cited.

UNITED STATES PATENT OFFICE
CERTIFICATE OF CORRECTION

Patent No. 2,850,501                              September 2, 1958

Walter Voegtli

It is hereby certified that error appears in the printed specification of the above numbered patent requiring correction and that the said Letters Patent should read as corrected below.

Column 3, line 42, for "(3,3-b)" read -- (3,4-b) --; column 6, line 51, for "diethylomino-" read -- diethylamino- --; line 58, for "soduim" read -- sodium --; column 7, line 23, for "(3(4-b)" read -- (3,4-b) --.

Signed and sealed this 16th day of December 1958.

(SEAL)
Attest:

KARL H. AXLINE
Attesting Officer

ROBERT C. WATSON
Commissioner of Patents